US012682338B2

(12) United States Patent
    Cardenes Cabre et al.

(10) Patent No.:    US 12,682,338 B2
(45) Date of Patent:        Jul. 14, 2026

(54) INTEGRATING IDENTITY MANAGEMENT WITH VERIFIABLE CREDENTIALS

(71) Applicant: Via Science, Inc., Somerville, MA (US)

(72) Inventors: Jesus Alejandro Cardenes Cabre, Montreal (CA); Madjid Aoudia, Rennes (FR); Jeremy Taylor, Montreal (CA)

(73) Assignee: Via Science, Inc., Somerville, MA (US)

( * ) Notice: Subject to any disclaimer, the term of this patent is extended or adjusted under 35 U.S.C. 154(b) by 0 days.

(21) Appl. No.: 19/413,480

(22) Filed: Dec. 9, 2025

(65) Prior Publication Data
    US 2026/0162100 A1      Jun. 11, 2026

Related U.S. Application Data

(60) Provisional application No. 63/730,097, filed on Dec. 10, 2024.

(51) Int. Cl.
    G06Q 20/36        (2012.01)
    G06Q 20/38        (2012.01)
(52) U.S. Cl.
    CPC ......... G06Q 20/36 (2013.01); G06Q 20/3821 (2013.01)
(58) Field of Classification Search
    CPC .............. G06Q 20/36; G06Q 20/3674; G06Q 20/3821; G06Q 2220/00; H04L 63/0815; H04L 63/10; H04L 9/50; H04L 9/3213
    See application file for complete search history.

(56) References Cited

U.S. PATENT DOCUMENTS 12,032,663 B2 *    7/2024   Murdoch .............. H04L 9/3234
2020/0304480 A1    9/2020   Buchner et al.
              (Continued)

OTHER PUBLICATIONS

Badirova, A., et al. "Integration of Self-sovereign Identity in Centralized Identity Management: SSI-based Authentications, Attribute-based Authorization." 2024 11th International Conference on Future Internet of Things and Cloud (FiCloud) (2024), 6 pages.
              (Continued)

*Primary Examiner* — Daniel B Potratz
(74) *Attorney, Agent, or Firm* — Pierce Atwood LLP

(57)                ABSTRACT

A system may be configured for integrating centralized identity management with decentralized identities and verified credentials. The techniques can bridge Web2 identity management with emerging Web3 decentralized credentialing to facilitate secure and interoperable access to resources with both Web2- and Web3-based authentication mechanisms. The systems and methods may streamline the registration and login processes by using a sequence of redirects and secure data exchanges to allow users to gain access to a requested resource easily with a single scan of their digital wallet application. The system can unify the user experiences for obtaining VCs and logging into a resource (whether Web2- or Web3-based) into a single flow by enabling decentralized authentication and authorization, even in cases where a user has not previously registered with the resource. The overall user experience may allow user-driven management of personal credentials while keeping registration and login time faster than password-centric equivalents.

20 Claims, 8 Drawing Sheets

(56)     References Cited

U.S. PATENT DOCUMENTS

| | | | |
|---|---|---|---|
| 2021/0385216 A1* | 12/2021 | Khalil | H04L 9/50 |
| 2022/0343319 A1* | 10/2022 | Murao | H04L 67/02 |
| 2023/0319039 A1* | 10/2023 | Murdoch | H04L 63/0884 |
| | | | 726/9 |
| 2023/0336361 A1* | 10/2023 | Cárdenes Cabré | |
| | | | G06Q 20/3674 |
| 2025/0322392 A1* | 10/2025 | Evans | G06Q 20/36 |

OTHER PUBLICATIONS

Notification of Transmittal of the International Search Report and the Written Opinion of the International Searching Authority, for International Patent Application No. PCT/US2025/058718, mailed on Mar. 5, 2026, 13 pages.

* cited by examiner

FIG. 1

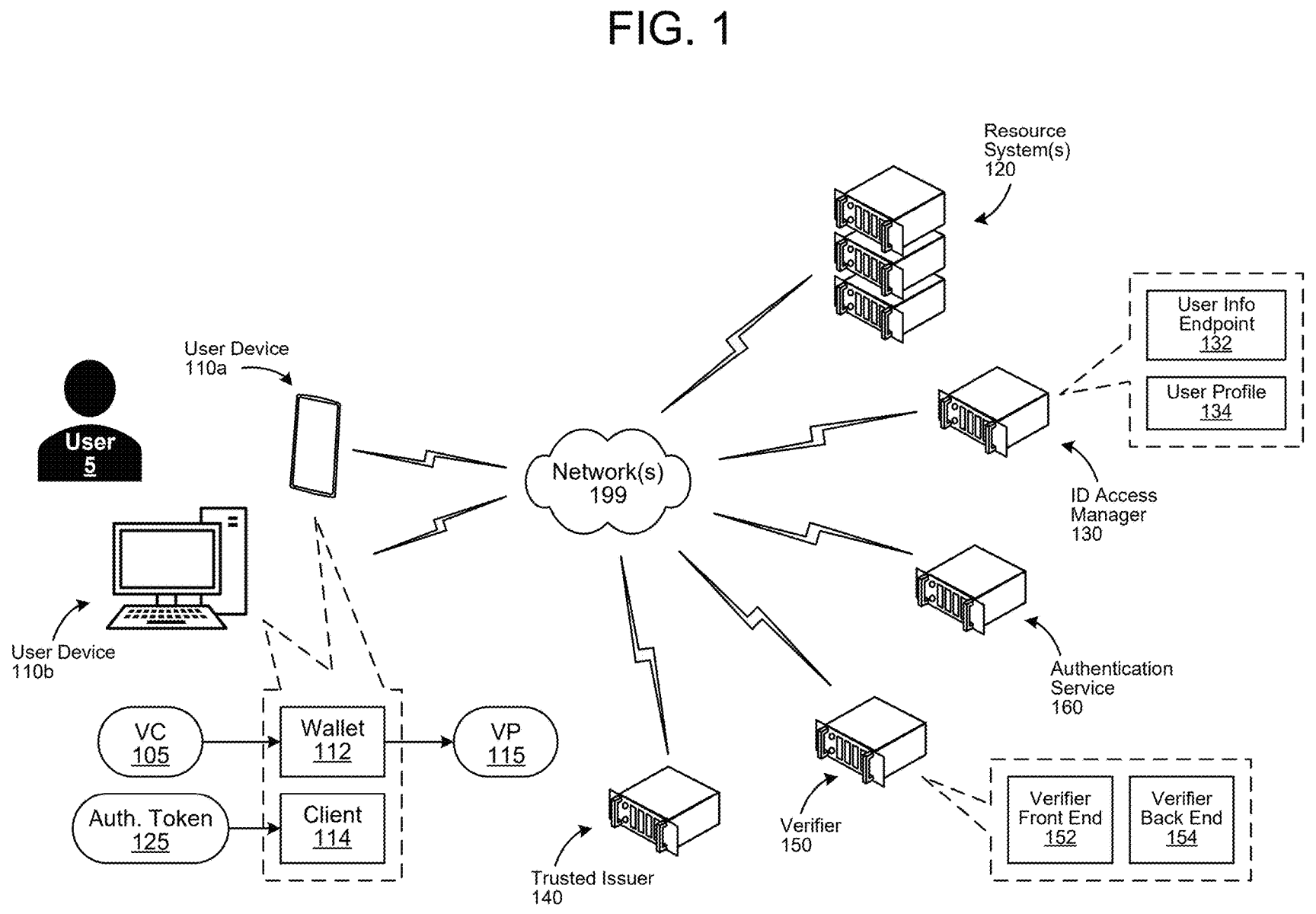

Resource System(s) 120

User Info Endpoint 132

User Profile 134

ID Access Manager 130

Authentication Service 160

Verifier Front End 152

Verifier Back End 154

Verifier 150

Network(s) 199

Trusted Issuer 140

VP 115

Wallet 112

Client 114

VC 105

Auth. Token 125

User Device 110a

User Device 110b

User 5

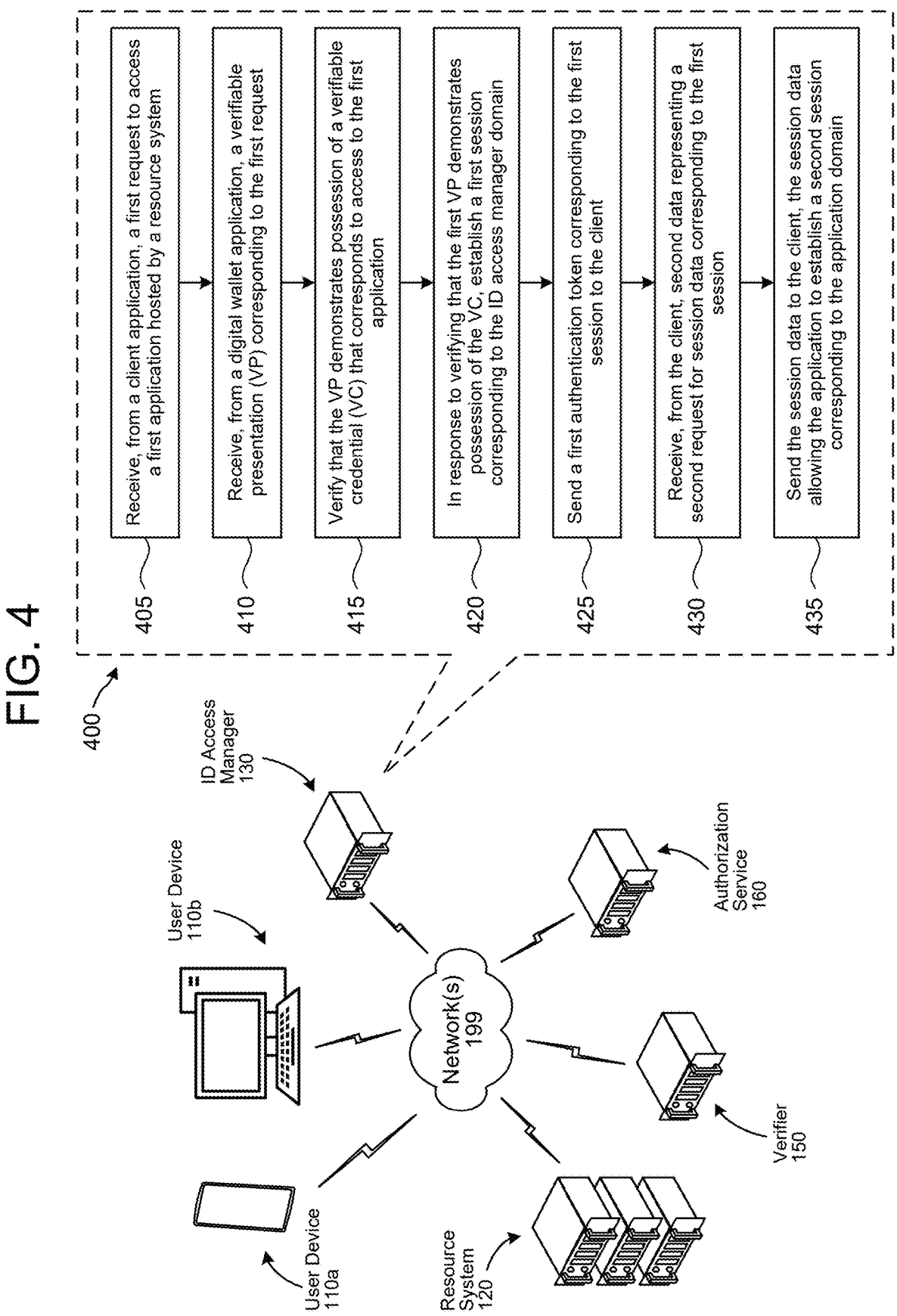

405 — Receive, from a client application, a first request to access a first application hosted by a resource system 410 — Receive, from a digital wallet application, a verifiable presentation (VP) corresponding to the first request 415 — Verify that the VP demonstrates possession of a verifiable credential (VC) that corresponds to access to the first application 420 — In response to verifying that the first VP demonstrates possession of the VC, establish a first session corresponding to the ID access manager domain 425 — Send a first authentication token corresponding to the first session to the client 430 — Receive, from the client, second data representing a second request for session data corresponding to the first session 435 — Send the session data to the client, the session data allowing the application to establish a second session corresponding to the application domain ID Access Manager 130

User Device 110b

Authorization Service 160

Network(s) 199

Verifier 150

User Device 110a

Resource System 120

Figure 5:
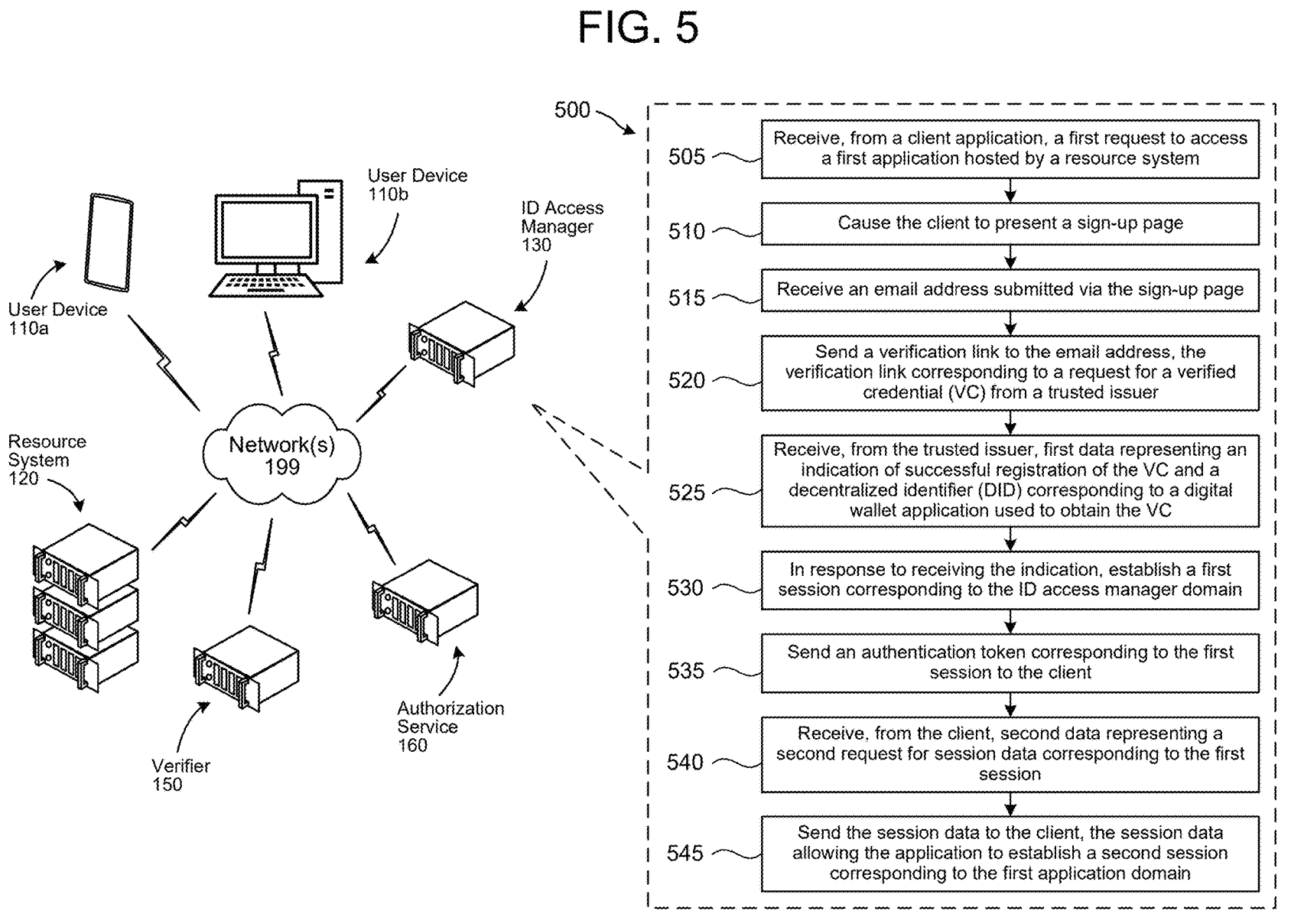

505  Receive, from a client application, a first request to access a first application hosted by a resource system 510  Cause the client to present a sign-up page 515  Receive an email address submitted via the sign-up page 520  Send a verification link to the email address, the verification link corresponding to a request for a verified credential (VC) from a trusted issuer 525  Receive, from the trusted issuer, first data representing an indication of successful registration of the VC and a decentralized identifier (DID) corresponding to a digital wallet application used to obtain the VC 530  In response to receiving the indication, establish a first session corresponding to the ID access manager domain 535  Send an authentication token corresponding to the first session to the client 540  Receive, from the client, second data representing a second request for session data corresponding to the first session 545  Send the session data to the client, the session data allowing the application to establish a second session corresponding to the first application domain User Device 110b ID Access Manager 130

User Device 110a

Network(s) 199

Resource System 120

Authorization Service 160

Verifier 150

FIG. 6

INTEGRATING IDENTITY MANAGEMENT WITH VERIFIABLE CREDENTIALS

CROSS-REFERENCE TO RELATED APPLICATION

This application claims the benefit of priority of U.S. Provisional Patent Application No. 63/730,097, filed Dec. 10, 2024, and entitled "System and Method for Integrating Web2 Identity Management with Web3 Verifiable Credentials," the content of which is incorporated herein by reference in its entirety.

BRIEF DESCRIPTION OF DRAWINGS

For a more complete understanding of the present disclosure, reference is now made to the following description taken in conjunction with the accompanying drawings.

FIG. 1 is a conceptual diagram illustrating the integration of identity management with verifiable credentials, according to embodiments of the present disclosure.

FIGS. 3A and 3B are signal flow diagrams illustrating an example login process, according to embodiments of the present disclosure.

FIG. 4 is a conceptual diagram illustrating an example method of facilitating registration and authentication of a user requesting access to a resource, according to embodiments of the present disclosure.

FIG. 5 is a conceptual diagram illustrating an example method of facilitating authentication of a previously registered user requesting access to a resource, according to embodiments of the present disclosure.

FIG. 6 illustrates a device and system component communicating over a computer network, according to embodiments of the present disclosure.

DETAILED DESCRIPTION

Figure 2A:
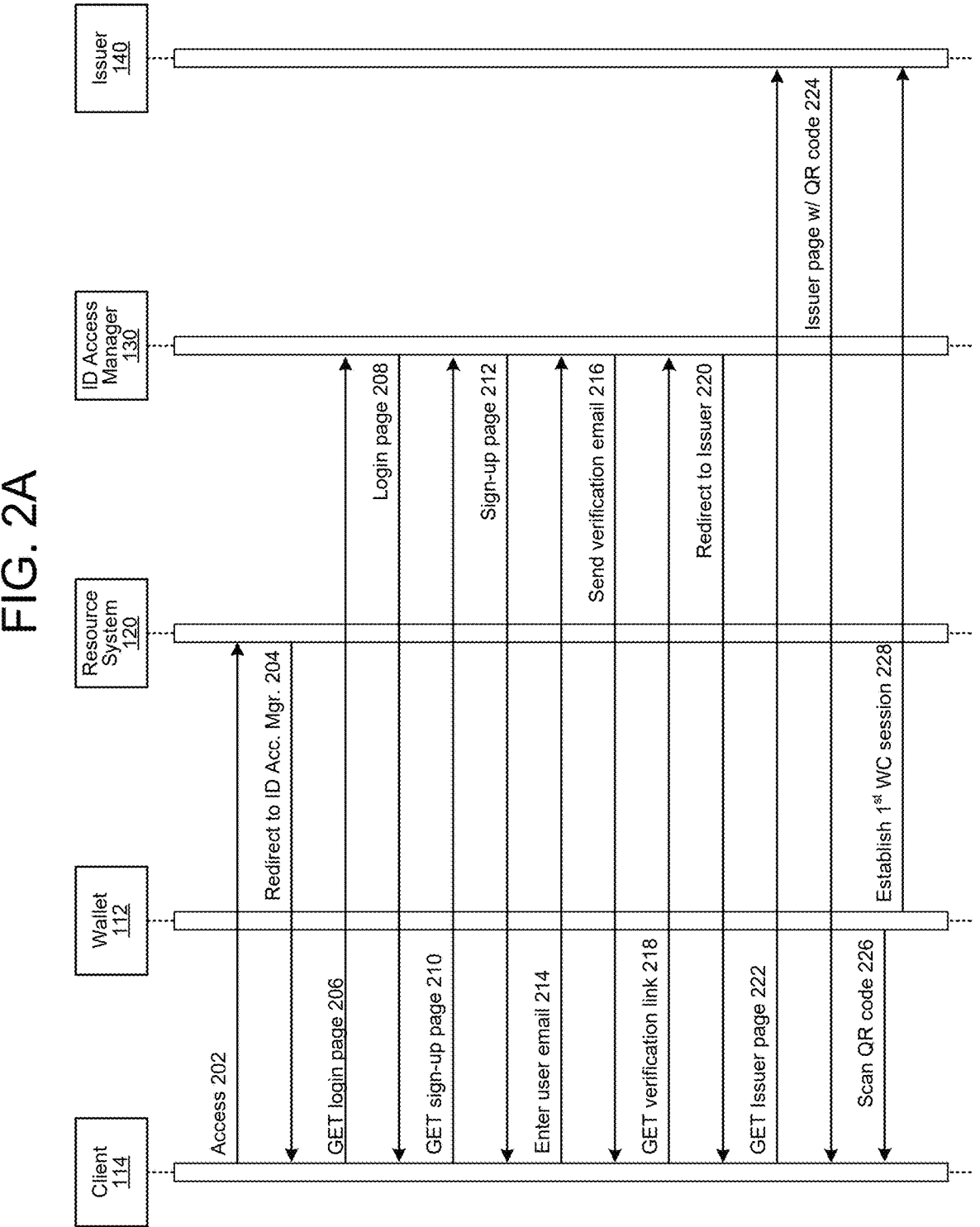
FIGS. 2A and 2B are signal flow diagrams illustrating an example registration process, according to embodiments of the present disclosure.

The Internet and other computer network technologies allow users to access resources hosted by computer systems both locally and over large geographic distances. The resources may include websites, applications, databases, etc. Some resources may be available for anyone with a browser to locate, visit, and use. Some resources may require a user to identify themselves and/or sign in using a password or passkey. A system hosting the resource may check the password or passkey against its database to see if it is valid and current.

Systems such as these may be referred to as hosting Web2 resources, such as websites and/or applications that rely on centralized management of passwords and tokens. For example, a central database may maintain information regarding user accounts including their corresponding passwords/passkeys. To promote convenience, the system may provide an authenticated user (e.g., one whose identity or password has been verified) with a token that allows the user to maintain a session of continued access to the system for a limited time before the user has to validate themselves again. The token may be a long number or string of characters similar to a password that the user/user device shares with the application when sending requests to the system over the course of the session. Because the user and the system exchange the token repeatedly, however, they face risk of another entity intercepting the token and using it for nefarious purposes.

In contrast, Web3 resources differ in the manner in which a user imports their identity into the system. While Web2 resources use centralized identity management, Web3 uses decentralized credentialing based on decentralized, asymmetric cryptographic credentials such as decentralized identifiers (DIDs) and verifiable credentials (VCs). A DID is a globally unique identifier that allows a user to be identified in a verifiable and persistent manner without the use of a centralized registry. The DID consists of a cryptographic key pair with a private key stored securely by the user (e.g., in a digital wallet application as described below) and a corresponding public key that can be recorded in a distributed ledger (e.g., a blockchain), which may store an immutable record of the public key and attributes associated with it. The user may prove their identity by signing a document with their DID private key, and a verifier may verify the user's identity using the corresponding public key.

A VC has an issuer and a holder (e.g., the user). The VC represents a document, cryptographically signed by the issuer, that associates or assigns one or more attributes to the user (e.g., the user's DID public key). A verifier may use the issuer's public key (e.g., corresponding to the issuer's private key used to cryptographically sign the VC) to verify that the user has the attributes. Thus, if the issuer is trusted, the user presenting a VC from the issuer can be trusted to have the attributes represented in the VC.

A user may use their DID and/or VC(s) to establish their identity and/or attributes when interacting with Web3 resources such as decentralized applications (or "dApps," described further below). Importantly, the user maintains sole control over the information in their DID and VC(s), in contrast to Web2 authentication methods that rely on the transmission of, for example, emails and passwords.

Offered herein are systems and methods for integrating Web2 identity management with Web3 VCs. The techniques can bridge Web2 identity management (e.g., based on traditional identity providers (IdPs)) with emerging Web3 decentralized credentialing (e.g., based on DIDs and VCs) to facilitate secure and interoperable access to Web2 and Web3 resources. The systems and methods may streamline the registration and login processes by using a sequence of redirects and secure data exchanges to allow users to gain access to a requested resource easily using a single scan of their digital wallet application. The system can unify the user experiences for obtaining VCs and logging into a resource (whether Web2- or Web3-based) into a single flow by enabling decentralized authentication and authorization, even in cases where a user has not previously registered with the resource. The overall user experience may allow user-driven management of personal credentials while keeping registration and login time faster than password-centric equivalents.

When a user requests access to a resource with which the user does not have an active session, the resource may redirect the user to an ID access manager for authentication. The user may provide their email address to the ID access manager, which may present the user with a QR code. The user can scan with their digital wallet application, which may use the information in the QR code to generate a verifiable presentation (VP) of their VC and send it to an authentication service. Upon verification of the VP by the authentication service, the ID access manager may provide the user with an authentication token and redirect the user to the requested resource. In addition, the ID access manager can establish a wallet connect session and securely store the session details for retrieval by the resource. Following the redirect to the resource, the resource can recover the wallet connect session details from the ID access manager. This may allow the user to continue accessing the resource, without having to reauthenticate themselves, for as long as the session remains valid.

If the user does not currently possess the relevant VC when requesting access to the resource, the ID access manager may facilitate registration as part of the login process. The resource may redirect the user to the ID access manager for authentication. The user may provide their email address to the ID access manager, which will send a verification link to the email address. When the user selects (e.g., activates or "clicks") the verification link, the ID access manager may present the user with a QR code. By scanning the QR code, the digital wallet application may establish a session with a trusted issuer and receive the VC, which the wallet may store securely. Upon completing registration, the ID access manager may provide the user with an authentication token, redirect the user to the requested resource, and establish a wallet connect session as before.

Thus, whether the user is registering for the first time or logging in with previously obtained VCs, the ID access manager can streamline the authentication process to allow the user to easily gain access to a resource, in many cases by simply entering their email address and performing a single scan with their digital wallet application.

Large organizations may use these techniques to streamline the registration and mobility of personnel at the organizational level and as they report to a particular office or location. For example, a member of the organization may have certain attributes such as a unique identifier, title, rank, and/or certain permissions/restrictions regarding access to information technology (IT) resources. The member may register with the organization to obtain a VC that corresponds to their unique identity and represents their attributes. Upon reporting to a particular location, the member may use their VC to log in to the local IT system. If the member moves to a new location, the member may use the same VC to access the new IT system without repeating the registration process.

In another use case, an enterprise benefit platform may use these techniques to allow their customers to easily sign-up and obtain VCs for accessing various providers within the network. A customer may register once with the platform, and then use their VC to access individual providers (e.g., to make appointments, receive or make payments, etc.) without having to separately register with each provider.

In another use case, a user may use their VC to establish a session that is interoperable between Web2 and Web3 applications. For example, the user may use a single login to establish a session with both a Web2-based merchant resource and a Web3-based cryptocurrency account (e.g., on a blockchain) in a single login flow. The user may then use funds from their cryptocurrency account to execute financial transactions with the merchant.

Various other use cases of the described system are possible. These features may be used alone or in combination with each other and/or other features described herein. Various operations of the systems and devices may be subject to user approval. The system may be implemented in a manner that ensures compliance with applicable laws, regulations, standards, etc., in the region(s) where the user, devices, and/or systems are located.

FIG. 1 is a conceptual diagram illustrating the integration of identity management with verifiable credentials, according to embodiments of the present disclosure. Offered herein are systems and methods for integrating identity management with verifiable credentials. The techniques can bridge Web2 identity management (e.g., based on traditional identity providers (IdPs)) with emerging Web3 decentralized technologies based on verifiable credentials (VCs) and DIDs to facilitate secure and interoperable access to Web2 and Web3 resources.

Figure 6:
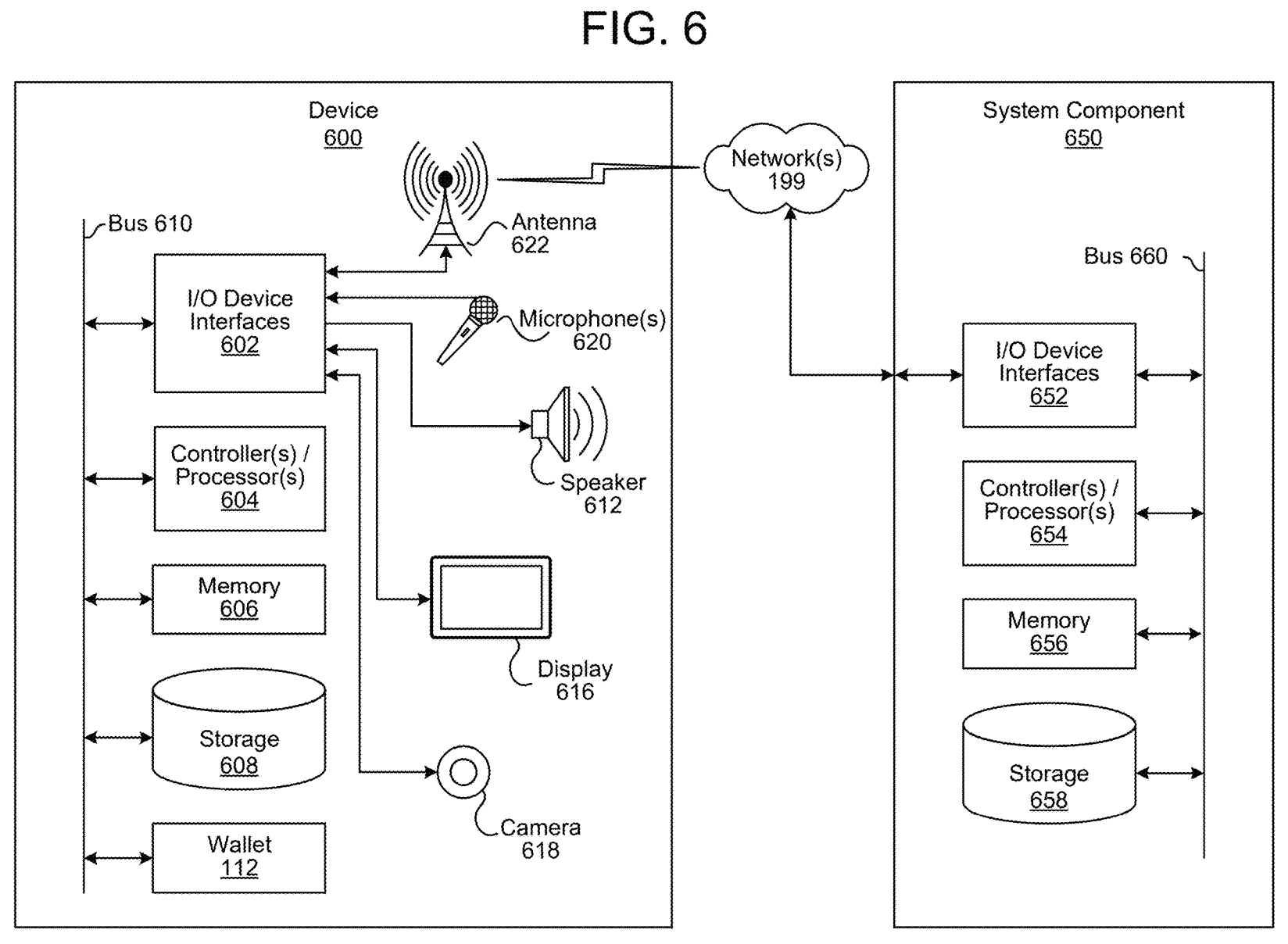

A user 5 may use a user device 110 to request access to a resource, which may be a service, application, website, etc., hosted by one or more resource system 120 available over a computer network 199. The resource system(s) 120 may host Web2 resources such as websites, applications (apps), web applications (web apps), databases, etc., which access and/or user identity based on centralized Web2 password and passkey-based authentication. The resource system(s) 120 may also host Web3 resources such as dApps, distributed ledgers, cryptocurrencies, etc., based on decentralized Web3 DIDs and VCs. VCs may be issued by a trusted issuer system 140. An authentication service 160 and verifier system 150 may work in concert to check a user's credentials by verifying a VP 115 generated by the user's wallet based on a VC 105 issued by the issuer 140. An ID access manager system 130 may authenticate user 5 identity and authorize access to online resources hosted by the resource system(s) 120; for example, by providing an authentication token 125. The resource system(s) 120, ID access manager 130, issuer 140, verifier 150, and/or the authentication service 160 may be executed on one or more system components 650 as illustrated in FIG. 6 and described below.

The user 5 may use the user device 110 (or multiple user devices 110a, 110b, etc.) to interact with the other components and systems. The user device(s) 110 may be, for example, a smartphone or a tablet, laptop, or desktop computer, etc., and may have components such as those of the example device 600 as illustrated in FIG. 6 and described below. The user device(s) 110 may include a digital wallet 112 and a client 114. In some cases, the wallet 112 and the client 114 may be on the same user device 110. In some cases, the wallet 112 may be on the first user device 110a while the client 114 may be on the second user device 110b. The digital wallet 112 and/or the client 114 may be software components stored in a memory of the user device 110 and executing on a processor (or processors) of the user device 110. In some cases, the wallet 112 may operate in or with a secure enclave for the storage of VCs, cryptographic keys, and/or other sensitive data. The digital wallet 112 may obtain and store VCs 105 from the issuer 140 (e.g., by establishing a wallet connect session). In some cases, the issuer 140 may encrypt the VC 105, and the wallet 112 may decrypt the VC 105 using keys previously exchanged between the wallet 112 and issuer 140. In some cases, the issuer 140 may send a confirmation code or PIN (personal identification number) to be displayed by the client 114. The user 5 may enter the code or PIN into the wallet 112 to decrypt the VC. The wallet 112 may use the VC 105 to generate a VP 115 that demonstrates possession of the VC to the authentication service 160 to access the resource system 120. Following verification of the VP 115, the ID access manager 130 may establish a wallet connect session with the wallet 112 and securely store the session details for retrieval by the resource system(s) 120. This may enable the resource system 120 to recover the wallet connect session details from the ID access manager 130, thus allowing the client 114 to continue accessing the resource without the user 5 having to reauthenticate themselves for as long as the session remains valid. This may also allow the client 114 to access one or more additional Web2- and/or Web3-based resource without repeating the login process.

The client 114 may be, for example, an application such as a browser executing on the user device 110. The user 5 may use the client 114 to request access to a resource hosted by the resource system 120. The client 114 may be prompted to register and/or log in to access the resource. Following registration/login, a session (e.g., an OpenID Connect session) is established with the client, allowing it to access the resource. The client 114 may receive an authentication token 125 corresponding to the session. In some implementations, the authentication token 125 may be an access token with an expiration date. The authentication token 125 may or may not include a data payload. In some cases, the token may simply be a random string of characters that is digitally signed by the entity who issued the token. In some cases, the authentication token 125 may be a JavaScript Object Notation (JSON) Web Token (JWT). JSON is an open standard file format that may use human-readable text to store and transmit data. A JWT is a proposed Internet standard for creating data with a JSON payload, with optional encryption and/or digital signature. A JWT may encode data such as "claims," which may correspond to user attributes, permissions, etc. If the JWT is signed by the issuer, a verifier may use the public key of the issuer to verify the claims. In some cases, the client 114 may store the authentication token 125 in the local storage of the user device 110 on which the client 114 is executing. In some cases, the client 114 may hold an encrypted HTTP-only session cookie while the resource system 120 holds the corresponding JWT. This may allow the resource to use the JWT to communicate with the ID access manager in an authenticated and/or secure manner. In contrast, the client 114 may store sensitive information such as the session details corresponding to the wallet connect session in a secure storage of the client 114 that is automatically cleared when the session ends; for example, when the browser tab is closed.

A resource system 120 may host one or more Web2 and/or Web3 resources such as a web app (e.g., application software created with web technologies and run via a web browser), dApp, website or service requiring authorization, distributed ledger such as a blockchain, etc.; thus, in some cases, the resource system 120 may be referred to as an app host. If the user 5 requests access to a resource system 120 (e.g., using the client 114), the user 5 may be prompted to present their authentication token 125 or VC 105. If the user 5 does not yet have a token or VC, the resource system 120 may redirect the client 114 to the ID access manager 130 to perform the registration and/or login process.

In some cases, the resource system(s) 120 may host one or more nodes of a blockchain. A blockchain may be a distributed ledger system made up of a plurality of distributed nodes that form a shared, replicated, synchronized data store. A blockchain may store data such as a transactions and smart contracts. A smart contract is a digital contract that executes automatically when predetermined terms and/or conditions are met. Decentralized applications (dApps) may have a back end that includes a smart contract stored on a blockchain and a front end that can be a traditional web app. A dApp can have additional decentralized/distributed components when its code and/or database(s) need to be modifiable (e.g., unlike the contents of a blockchain, which are immutable) and/or when the code and/or database(s) grow larger than what can be practically stored on the blockchain.

A user 5 may establish their identity with a dApp using their DID and/or authenticate themselves with dApp using their VC.

The nodes of a distributed ledger may execute a consensus algorithm to determine the correct updated ledger to represent the addition of new data (e.g., following receiving data from an authenticated user 5). The distributed nodes may form a peer-to-peer network (e.g., within and/or across the computer network 199) to propagate updates once the correct updated ledger is determined. Each distributed node may then update itself accordingly. The result is a tamper resistant (e.g., immutable or substantially immutable) record of the received data replicated across multiple nodes and without a single point of failure.

The distributed ledger may be a linear data structure (e.g., a chain such as blockchain) or a more complex structure like a directed acyclic graph. A directed acyclic graph in the context of a distributed ledger may be made up of blocks of data and edges indicating adjacency of data blocks added to the distributed ledger. Each edge is directed, indicating a direction from an existing data block to a new data added to the existing data block. The structure is acyclic in that it contains no paths by which a data block can be crossed twice by traversing any sequence of edges according to their direction (e.g., no edges are directed "backwards" in time). A data block may, however, have multiple edges directed to it and/or away from it.

The consensus algorithm may be a proof-of-work algorithm or a proof-of-stake algorithm. A proof-of-work algorithm is a form of cryptographic proof an entity can use to prove to others that it has performed a certain about of computational work. The proof is asymmetric in that a verifier may confirm the proof with minimal computational effort. An example of proof-of-work in the context of distributed ledgers is "mining" for cryptocurrency, where mining refers to the incentive structure used to encourage nodes to expend computational effort to add data blocks to the distributed ledger. In contrast, proof-of-stake protocols only allow nodes owning some quantity of data blocks (e.g., blockchain tokens) to validate and add new data blocks. Proof-of-stake protocols prevent attackers from hijacking validation by requiring an attacker to acquire a large proportion of data blocks. Proof-of-stake protocols include, for example, committee-based proof of stake, delegated proof of stake, liquid proof of stake, etc.

Distributed ledgers may be permissioned or permissionless. A permissioned distributed ledger may refer to a private system having a central authority for authorizing nodes to add data blocks. In some cases, a consortium may agree to operate a distributed ledger jointly among the participating organizations while excluding others. A permissionless distributed ledger may refer to an open or public network for which no access control is used. Any entity may add to the distributed ledger, provided they satisfy the consensus algorithm (e.g., proof of work). An example of a permissionless distributed ledger is bitcoin and other cryptocurrencies that require new entries include a proof of work. In some implementations, the distributed nodes may be open (e.g., viewable by the public) to allow observers to see data recorded on the blockchain.

The ID access manager 130 is a system that can authenticate user identity and authorize access to online resources (e.g., apps hosted by the resource system 120). The ID access manager 130 may perform various functions including simplifying user access to applications with single sign-on (SSO), managing passwords and access control for resource systems 120, and providing enhanced security via multi-factor authentication (MFA), etc. In some implementations, the ID access manager 130 may be implemented using software such as Keycloak.

The ID access manager 130 may manage aspects of the registration and login processes. A user 5 may be redirected to the ID access manager 130 when requesting access to a resource hosted by a resource system 120. During a registration process, the ID access manager 130 may obtain user attributes such as their DID, domain of the issuer 140, and/or attributes provided by the issuer 140. The attributes may include, for example, the user's role(s) within the organization (e.g., title, rank, position, and/or responsibilities), group membership(s), email address and/or username, etc. The ID access manager 130 may direct the user 5 to the issuer 140 to obtain a VC (e.g., by sending a verification link to the user's email address). When the issuer 140 notifies the ID access manager 130 that registration is complete, the ID access manager 130 can send the client 114 an authentication token 125 and redirect it to the resource system 120 hosting the requested resource.

During a login process, the ID access manager 130 may establish a session with the client 114 (e.g., an OpenID Connect (OIDC) session) and a wallet connect session with the wallet 112. When the ID access manager 130 receives a request redirected from a resource system 120 for a user 5 already registered with the system, the ID access manager 130 may prompt the user 5 for their email address. The ID access manager 130 may send the email address to the authentication service 160 (e.g., using an HTML POST command). This initiates the creation of the OIDC session. The authentication service 160 may return a session cookie to the ID access manager 130. The session cookie may contain a sessionID for the session. The ID access manager 130 may present the client 114 with a QR code page. The client 114 may load the QR code page, which may cause the client 114 to send a request with the sessionID to the verifier 150 (e.g., via a verifier front end 152) to obtain the QR code contents for the QR code page. The verifier front end 152 may return the QR code contents for display by the client 114. The user 5 may use their wallet 112 to scan the QR code, which will prompt the wallet 112 to use the VC obtained during the registration process to generate and send a VP to the authentication service 160 for verification. Upon verification of the VP, the ID access manager 130 may finish establishing the OIDC session by providing the user 5 with an authentication token 125, which the user 5 may use to access the resource system 120. The ID access manager 130 may then redirect the client 114 to the resource system 120.

Following authentication, the ID access manager 130 may establish a wallet connect session between the client 114 and the wallet 112. The wallet connect session is a secure communication pipeline that may allow the client 114 and/or a resource (e.g. application) that the client 114 is interacting with to retrieve information corresponding to that wallet 112. For example, the ID access manager 130 may establish a first wallet connect session between the client and the wallet 112 that may allow the client 114 to obtain information from a user profile 134 corresponding to the wallet 112 (e.g., the user profile 134 may correspond to the same DID as the wallet 112). This may allow the client to obtain wallet connect session details from the ID access manager 130. The ID access manager 130 may store the session details in the ID access manager backend (e.g., associated with a userinfo endpoint 132). Once the client 114 has the session details, the resource system 120 can establish a second wallet connect session. This may allow the resource system 120 to send requests to the wallet 112 (e.g., for identity, credentials, payment info, etc.) based on interactions with the client. This may allow the user 5 to continue accessing the resource using the client 114 and/or their wallet 112 for as long as the session remains valid, without having to reauthenticate themselves and without the client 114 having to store sensitive information in the user device 110 local storage, which may not be as secure as the wallet 112.

In some cases, the ID access manager 130 and resource system 120 may use a backend for frontend pattern to exchange cookies. For example, the resource system 120 may host a resource with an app frontend and an app backend. The client 114 may hold a session cookie, which may be marked Secure and HttpOnly. The client 114 may interact with the app frontend using the session cookie. The app frontend may use a gateway such as an Envoy gateway to exchange the session cookie for a JWT. The app backend may receive the JWT and use the JWT to communicate with the userinfo endpoint 132 in an authenticated way.

As part of the registration process, the user 5 may obtain a VC from the trusted issuer 140. The issuer 140 may be a system entity that creates and manages identity and/or credential information for principals such as the user 5, the user device 110, and/or individual computational entities such as processes and threads. In some implementations, the issuer 140 may be an IdP such as Okta, Inc. of San Francisco, CA or the Google customer identity and access management (CIAM) platform. In some implementations, the issuer 140 may be part of an organization associated with the resources the user 5 wishes to access. The VC may indicate an attribute of the holder such as identity, age, rank, title, association with various entities, etc. Entities such as a resource system 120 and/or an ID access manager 130 may outsource user authentication to the issuer 140. Thus, once the user 5 establishes their identity with the issuer 140 and receives the VC, the user 5 may use the VC to authenticate themselves with various relying parties. Thus, in some cases, the issuer 140 can allow for a user 5 to user single sign-on (SSO) to access various resource systems 120. The user device 110 may receive the VC 105 and store them in the digital wallet 112.

When the user 5 requests access to an app or website hosted by a resource system 120, the resource system may redirect user's client 114 to the ID access manager 130. If the user 5 has not previously registered with the system, the ID access manager 130 may initiate the registration process by sending a verification link to an email address provided by the user 5. The verification link will cause the client 114 to present a QR code provided by the issuer 140. The user 5 may scan the QR code using their wallet 112 to obtain the VC. The wallet 112 may provide the issuer 140 with the user's DID. The issuer 140 may generate the VC by digitally signing a document that contains the user's DID and attributes. The user 5 may use the VC obtained from the issuer 140 to establish their identity and/or attributes with the ID access manager 130 and/or authentication service 160 during registration and/or login.

The verifier 150 may be a service or system that handles verification of VPs generated by the wallet 112. The verifier 150 may be a component of the ID access manager 130 or authentication service 160, or a standalone system. The verifier 150 may include a verifier front end 152 for providing a setup for a VP and a verifier back end 154 for verifying the VP. Once a user 5 has registered with the system and obtained their VC, the user 5 may request access to a resource (and/or be redirected to the resource by the ID access manager 130). To initiate a session, the ID access manager 130 may present the client 114 with a QR code page that can present QR code contents provided by the verifier front end 152. The verifier front end 152 may generate the QR code contents, which will instruct the wallet 112 of the requesting user 5 how to generate a VP that proves the user 5 has possession of the VC (e.g., previously obtained from the issuer 140 and stored in the wallet 112). The client 114 may display the QR code contents, and the wallet 112 may scan the QR code and generate the VP. If the wallet 112 and client 114 are on the same user device 110, the wallet 112 may scan the QR code using a screen capture. If the wallet 112 and client 114 are on separate user devices 110*a* and 110*b*, respectively, the wallet 112 may scan the QR code using a camera 618 of the user device 110*a*. The wallet 112 may present the VP to the authentication service 160, which may call on the verifier back end 154 to verify the VP. Once the verifier back end 154 verifies the VP, the authentication service 160 may notify the ID access manager 130 (e.g., using a SAML assertion as described below), which will open the session between the client 114 and the requested resource.

In some implementations, the VP may be a zero-knowledge proof (ZKP). The ZKP may allow the user 5 to request access to a resource, and the authentication service 160 and/or verifier 150 to verify the request, without the user 5 publicly identifying themself or divulging any of their attributes. A ZKP allows an entity to prove a claim without revealing any additional information. For example, a "prover" can share a proof of the claim with a "verifier" who can verify the accuracy of the proof In some cases, a ZKP may not prove the claim with certainty, but the acts of proving and verifying may be repeated until the prover demonstrates to the verifier (and, in some case, an external observer or observers) a sufficiently high statistical likelihood that the claim is true, rather than a series of lucky guesses.

A ZKP of a claim may satisfy three properties: completeness, soundness, and zero-knowledge. Completeness means that if the claim is true, an honest prover can convince an honest verifier of the claim. Soundness means that if the claim is false, no cheating prover can convince an honest verifier of the claim (e.g., except for some very small probability, which may be reduced by further iterations of proof). Zero-knowledge means that if the claim is true, no verifier (or observer) will learn anything other than the fact that the claim is true.

A ZKP may be interactive or non-interactive. An interactive proof system may involve a repeated exchange of messages between the prover (e.g., the user 5, or more accurately, the wallet 112) and the verifier (e.g., verifier 150). In an interactive proof system, it may be assumed that the prover has access to abundant computational resources but cannot be trusted. In contrast, the verifier may be assumed to be trustworthy but have limited computational resources. The interactive proof system may also involve an ability of the verifier to make random choices. Through an exchange of messages, the prover may establish a near-certain likelihood that its claim is true, without divulging any information beyond the fact of the truth of the claim. For example, the verifier may determine that receiving N consecutive verifiable proofs from a prover makes the probability that the prover is asserting a false claim exceedingly low. The verifier may select a value of N and/or a threshold confidence score (e.g., corresponding to a likelihood that the prover possesses the credentials it asserts) based on, for example, the potential harm of a bad actor accessing the requested resource or action. An example of a zero-knowledge protocol that may be used to perform an interactive ZKP is a zero-knowledge Scalable Transparent Argument of Knowledge (zk-STARK); however, some versions of zk-STARK may operate non-interactively.

A non-interactive ZKP may offer advantages over interactive proofs. For example, a non-interactive proof may be used when the prover and verifier cannot interact (e.g., communicate in real time). Thus, non-interactive proofs may be useful in decentralized systems such as a distributed ledger system made up of the distributed nodes. The distributed nodes may use the ZKP to verify transactions (e.g., adding new policies to the ledger) without oversight of a central authority. For example, a distributed node may verify that an entity is authorized to write policies, public keys, and/or other data to the blockchain. An example of a non-interactive zero-knowledge protocol is a zero-knowledge Succinct Non-interactive Argument of Knowledge (zk-SNARK). A ZKP protocol (e.g., such as zk-SNARK, zk-STARK, and/or others) may be transparent and/or universal. A transparent protocol is one that does not require a trusted setup but may rely on public randomness. A universal protocol is one that does not require a separate trusted setup for each arithmetic circuit, where an arithmetic circuit represents a directed acyclic graph involving the addition and/or multiplication of numbers; for example, to compute a polynomial.

In some implementations, the authentication service 160, the verifier 150, and/or other entity may provide a trusted setup for the ZKP. For example, in some implementations, the verifier 150 may send prover setup to the wallet 112, and verifier setup to the authentication service 160. The prover setup and the verifier setup may be collectively referred to as a "trusted setup". In some implementations, the prover setup may be data representing, for example, a prover key and/or a structured reference string. In some implementations, the verifier setup may be data representing, for example, a verifier key and/or a structured reference string. The trusted setup may facilitate the ZKP between the prover and the verifier. The entities may use the ZKP to establish that the user 5 possesses a valid VC issued by the issuer 140. By using the ZKP, the user 5 may keep their exact identity and/or attributes hidden from the authentication service 160 and/or any observer(s) of the data that passes between the entities. An observer may, however, be permitted to witness the operation(s) performed and/or the results thereof. This may allow the observer to see that the request was properly authorized and/or authenticating; thus balancing the interests of privacy for the user 5 and trust on the part of the observer.

In some implementations, the user 5 may register to obtain a VC from the issuer 140. The VC may correspond to one or more attributes about (or assigned to) the user 5. For each attribute ("att"), the issuer 140 may send the wallet 112:

$$\sigma_{att} = \mathrm{sign}_{pk(IdP)}\left(att \| pk_{Requestor}\right)$$

The user 5 may wish to prove a claim c about an attribute; for example, that the user 5 is over the age of 18, the user 5 is a member of organization ABC, the user 5 has been granted certain permissions (and/or certain restrictions) with respect to a particular resource. As can be appreciated, a number of claims/attributes are possible. The user 5 may prove to the authentication service 160 that c(att) is true, that the issuer 140 certifies that the user 5 has the attribute att, and that att was signed (e.g., that att was used to assert claim c).

The user 5 may receive the prover setup from the issuer 140. The prover setup may represent a prover key for the corresponding claim $PK_{Idp,c}$ and a structured reference string $SRS_{IdP}$.

Using the prover setup, the wallet 112 may build the following proof:

$$P_{att,Requestor,IdP} = \text{Proof}(\sigma_{att} \text{ is valid and } c(att) == \text{true}, PK_{IdP,c}, SRS_{IdP})$$

Which verifies that:

$$\text{verify}(\sigma_{att}, att \| pk_{Requestor}) == \text{true and } c(att) == \text{true})$$

The wallet 112 may send the proof $P_{att,Requestor,IdP}$ to the authentication service 160 and/or verifier 150. The authentication service 160 and/or verifier 150 may fetch the verifier setup. The verifier setup may represent a verifier key for the corresponding claim $VK_{IdP,c}$ and a structured reference string $SRS_{IdP}$. The authentication service 160 and/or verifier 150 may then verify the proof P from the wallet 112:

$$\text{Verify}(P_{att,Requestor,IdP}, VK_{IdP,c}, SRS_{IdP}) == \text{valid}$$

If the claim c accurately represents the VC, the proof P will establish that c(att) is true and/or that att was properly assigned to the user 5. The authentication service 160 may then establish a session corresponding to the user's request.

The authentication service 160 is a component that handles verifying a user's VP and validating sessions. In some implementations, the authentication service 160 may be a standalone system separate from the ID access manager 130. In some cases, the authentication service 160 may be plugin or component of the ID access manager 130. The authentication service 160 can verify the authenticity of a VC and check specific claims and/or attributes within the VC. In some cases, the authentication service 160 may determine whether the VC has been revoked (e.g., based on a revocation newer than the issue date of the VC). If the authentication service 160 determines that the VP is valid, the authentication service 160 may return a message to the ID access manager 130 that the session has been verified. The message may be, for example, a security assertion markup language (SAML) assertion. SAML is an open standard for exchanging authentication (e.g., that the user is who they say that are) and authorization (e.g., that the user has permission to access the requested resource) data between entities such as the authentication service 160 and the ID access manager 130. The SAML assertion may be consumed by Web2 applications that support SAML-based SSO.

In addition to generating the SAML assertion, the authentication service 160 may also extract the user's DID from the VC. The DID may serve as a unique identifier for the user 5; for example, on the blockchain and in Web3 applications. With their DID, the user 5 can access dApps that support DID-based authentication. By presenting their VC and DID to a dApp, the user 5 can login and interact with the app without the need for a traditional password or username.

The authentication service 160 may verify whether the user's identity and/or attributes match those recorded by the ID access manager 130 (e.g., which may set the DID/ attributes as config values of the MFA plugin). If the DID and attributes of the VP match those of the user profile 134 stored by the ID access manager 130, the authentication service 160 may notify the ID access manager 130 that the session with the user has been validated.

Figure 2B:
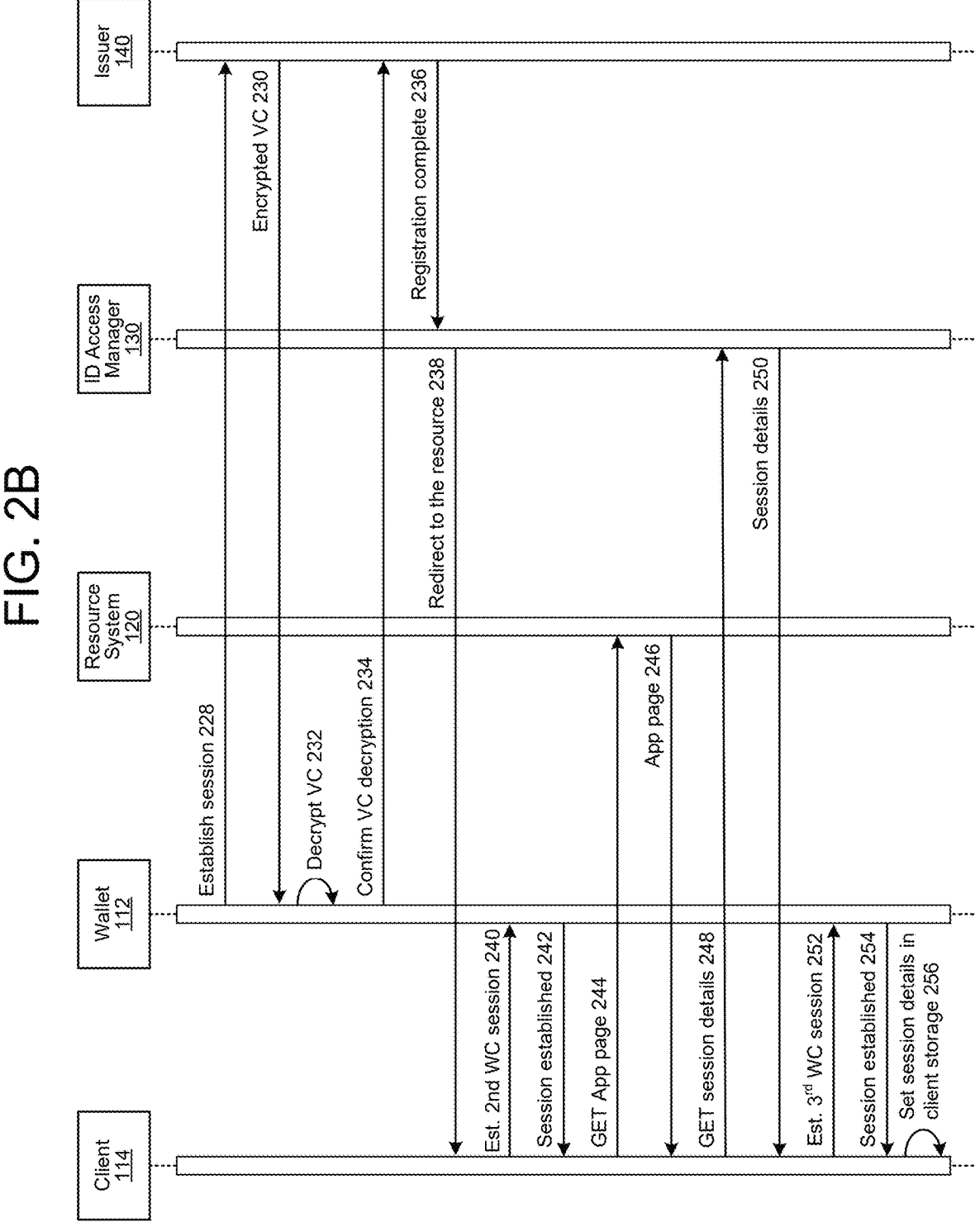

FIGS. 2A and 2B are signal flow diagrams illustrating an example registration process, according to embodiments of the present disclosure. A user 5 may use their user device(s) 110 to request access to a resource hosted by resource systems 120. The user device(s) 110 may include a wallet 112 and/or a client 114 (e.g., a browser application). In some cases, the wallet 112 and the client 114 may be on the same user device 110. In some cases, the wallet 112 may be on the first user device 110a while the client 114 may be on the second user device 110b. In either case, the user 5 may navigate the client 114 to a sign-in page of the resource, which may be a website, webapp, dApp, etc., hosted by the resource system 120. If the user device 110 is not currently engaged in a valid session with the resource system 120, the resource system 120 may redirect the client 114 to a sign-up page hosted by the ID access manager 130. The sign-up page may prompt the user 5 to enter their email address to receive a verification link. The user 5 may receive an email containing the verification link. In some cases, the issuer 140 may encrypt the VC. The wallet 112 may decrypt the VC in various ways. In some cases, the wallet 112 and the issuer 140 may exchange cryptographic keys (e.g., via a wallet connect session or a secure side channel). In some cases, the issuer 140 may present the client 114 with a subsequent page showing a confirmation code or PIN. The user 5 may decrypt the VC by entering the code displayed by the client 114 into the wallet 112.

When the user 5 selects the verification link, the client 114 is redirected to a page presented by the issuer 140. The page may present a confirmation message. The client 114 may proceed to a next page, which may display a QR code provided by the issuer 140. The user 5 may scan the QR code using the wallet 112 to establish a wallet-connect session. If the wallet 112 and client 114 are on the same user device 110, the wallet 112 may scan the QR code using a screen capture. If the wallet 112 and client 114 are on separate user devices 110a and 110b, respectively, the wallet 112 may scan the QR code using a camera 618 of the user device 110a. Once the wallet 112 scans the QR code, a wallet connect session is established between the wallet 112 and the issuer 140. The wallet 112 may provide the user's DID. The issuer 140 may generate a VC representing the user's DID and attributes, and return it to the wallet 112 via the wallet connect session. The wallet 112 may confirm receipt of the VC (and/or decryption of the VC). Upon receiving the confirmation, the issuer 140 may notify the ID access manager 130 that registration is complete, at which point the ID access manager 130 may provide the client 114 with an authentication token 125 and redirect the client 114 to the sign-in page of the requested resource. The ID access manger 130 may establish a new (e.g., second) wallet connect session between the client 114 and the wallet 112, which will allow the client 114 to retrieve session details from the ID access manager 130. The session details may allow the resource system 120 to establish a third wallet connect session between the client 114 and the wallet 112. The third wallet connect session may correspond to the domain of the resource system 120, while the second wallet connect session corresponded to the domain of the ID access manager 130. The resource system 120 can establish third wallet connect session when the client 114 receives the session details, or sometime later. This may allow the resource system 120 to send requests to the wallet 112 (e.g., for the user's approval) based on interactions with the client 114. When the third wallet connect session is established, the client 114 can set the session details in its secure storage location corresponding to that session.

In further detail, the registration steps may be as follows. At step 202, the user 5 may use the client 114 to request resource such as an app, web app, dApp, etc., hosted by the resource system 120. If the resource system 120 determines that the user 5 is not currently engaged in a valid session, it may, at step 204, redirect the client 114 to the ID access manager 130. Upon the redirect, at step 206, the client 114 may GET a login page of the ID access manager 130. At step 208, the ID access manager 130 may present the login page to the client 114. The login page may present the user 5 with a link to a sign-up page, where the user 5 may register to receive a VC for accessing the app or app site. If the user 5 does not have a VC or other credential with which to log in, the user may select the sign-up page link. At step 210, the client 114 may GET the sign-up page at the link. At step 212, the ID access manager 130 may present the sign-up page to the client 114. The sign-up page may prompt the user 5 for the email address the user 5 wishes to use to obtain the VC. The user 5 may enter their email address (e.g., manually or auto-filled by or into the client 114) and, at step 214, the client may send the email address to the ID access manager 130. The ID access manager 130 may verify the email address by, for example, checking that it is a valid email format and/or that the email domain and/or full address corresponds to an account permitted to receive a VC for accessing the app or app site. If the email address is valid/permitted, the ID access manager 130 may, at step 216, send a verification email to the email address (e.g., via a simple mail transfer protocol (SMTP) server). The verification email may include a verification link that the user 5 can use to continue the registration process.

When the user 5 receives the email, the user 5 may select the verification link, which may cause the client 114 to send, at step 218, a request (e.g., GET verification link) to an endpoint hosted by the ID access manager 130. The landing page of the endpoint may present the user 5 with a confirmation message and allow the user 5 to continue the registration process. At step 220, the ID access manager 130 may send the client 114 a redirect message that will bring the client 114 to the issuer 140. The redirect message may include an HTTP status code 302, which can indicate a temporary relocation of the requested resource to a different URL (e.g., corresponding to a different endpoint hosted by the issuer 140). The redirect message may include one or more attributes such as the email address and/or username of the user 5. Upon being redirected, the client 114 may, at step 222, GET an issuer page from the issuer 140. The issuer 140 may, at step 224, return the issuer page. The issuer page may include a QR code for establishing a wallet connect session. The client 114 may display the QR code. At step 226, the user 5 may cause the wallet 112 to scan the QR code. At step 228, the wallet 112 may use the information in the QR code to establish a wallet connect session with the issuer 140.

With the wallet connect session established, the login process may continue with the steps shown in FIG. 2B. The issuer 140 may issue a VC to the wallet 112 based on the DID associated with the wallet 112/user 5. The VC may include one or more attributes including the DID, the email address of the user (e.g., provided at step 214), the domain, etc. In some cases, the issuer 140 may encrypt the VC prior to transmission to the wallet 112. At step 230, the issuer 140 may send the VC to the wallet 112 via the wallet connect session. The wallet 112 may receive the VC and, at step 232, decrypt the VC in various ways. In some cases, the wallet 112 and the issuer 140 may exchange cryptographic keys (e.g., via the wallet connect session or a secure side channel). In some cases, the issuer 140 may present the client 114 with a subsequent page showing a confirmation code or PIN (personal identification number) that the user may enter into the wallet 112 to decrypt the VC. After decrypting the VC, the wallet 112 may, at step 234, send a confirmation of receipt/decryption of the VC back to the issuer 140. Upon receiving the confirmation, the issuer 140 may, at step 236, send a message to the ID access manager 130 that the registration process has been completed. At step 238, the ID access manager 130 may provide the user with an authentication token 125 for accessing the requested resource, and redirect the client 114 to the resource system 120.

Following authentication, the ID access manager 130 may, at step 240, establish a second wallet connect session with the wallet 112. The second wallet connect session may correspond to a domain of the ID access manager 130. The wallet connect session creates a secure communication pipeline that may allow the client 114 to retrieve session details from the ID access manager 130. The ID access manager 130 may store the session details in the user profile maintained by the ID access manager backend (e.g., associated with a userinfo endpoint 132). After the ID access manager 130 redirects the client 114 to the resource, the client 114 can recover the wallet connect session details from the ID access manager 130 (e.g., by querying a userinfo URL associated with the userinfo endpoint 132). At step 242, the second wallet connect session is established with the client 114. At step 244, the client 114 may use the session cookie to GET the app page (e.g., corresponding to the requested resource) from the resource system 120, which may return the app page at step 246. At step 248, the client 114 may send a request to the ID access manager 130 for the session details for the second wallet connect session (e.g., stored in the user profile). The request may include the authentication token 125 received at step 238. The ID access manager 130 may retrieve the session details from the user profile, and return them to the client 114 at step 250. The client 114 having these session details available may allow the resource system 120 to request a new wallet connection corresponding to the domain of the resource. The resource system 120 can establish the new wallet connect session when the client 114 receives the session details at step 250 (or shortly thereafter), or sometime later (e.g., in response to a future interaction between the client 114 and the resource). At steps 252 and 254, the resource system 120 may establish a third wallet connect session using the session details received at step 250. The client 114 may set the session details in its secure session storage at step 256. The client's secure session storage may be used to store sensitive data that will be cleared when the session ends (e.g., the browser tab is closed, the app is exited, the user device 110 is powered down, etc.). The secure session storage is distinct from the local storage of the user device 110, which may be used to store non-sensitive and/or public data, and which may persist across sessions and/or after a session has ended. Notably, the operations illustrated in FIGS. 2A and 2B (e.g., establishing the successive wallet connect sessions) do not require multiple authentications by the user 5. The user 5 can simply provide their email address at step 214, scan the QR code at step 226, and approve the presentation of their VC, and the system can securely handle the verifications and exchanges of data used to establish the third wallet connect session. With the third wallet connect session established, the resource system 120 may send requests to the wallet 112 (e.g., for identity, credentials, payments, etc.) based on interactions with the client 114. The wallet 112 may prompt the user 5 to confirm a request and, if the user 5 approves, the wallet 112 may provide the resource system 120 with the requested data.

Figure 3A:
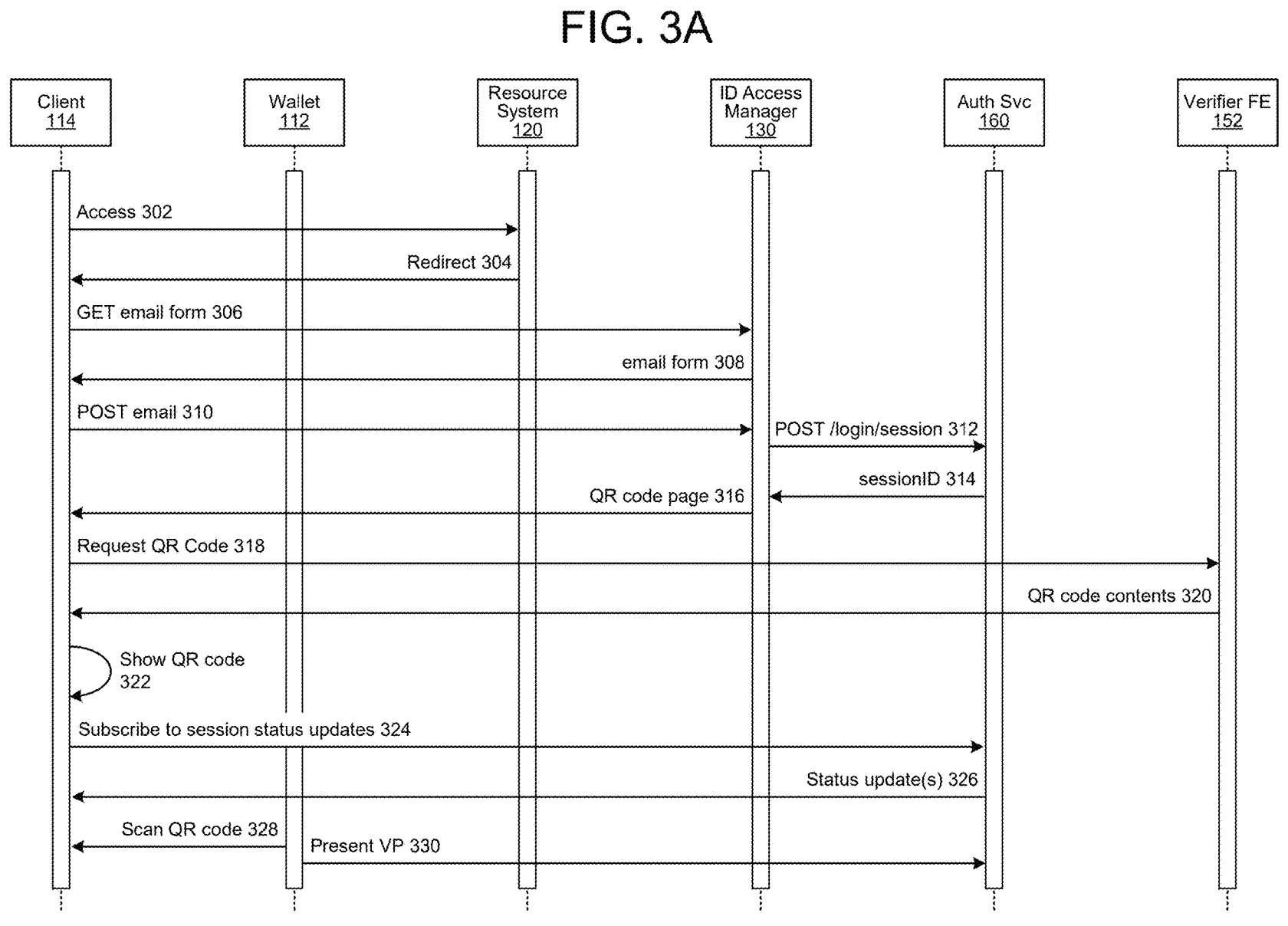
Figure 3B:
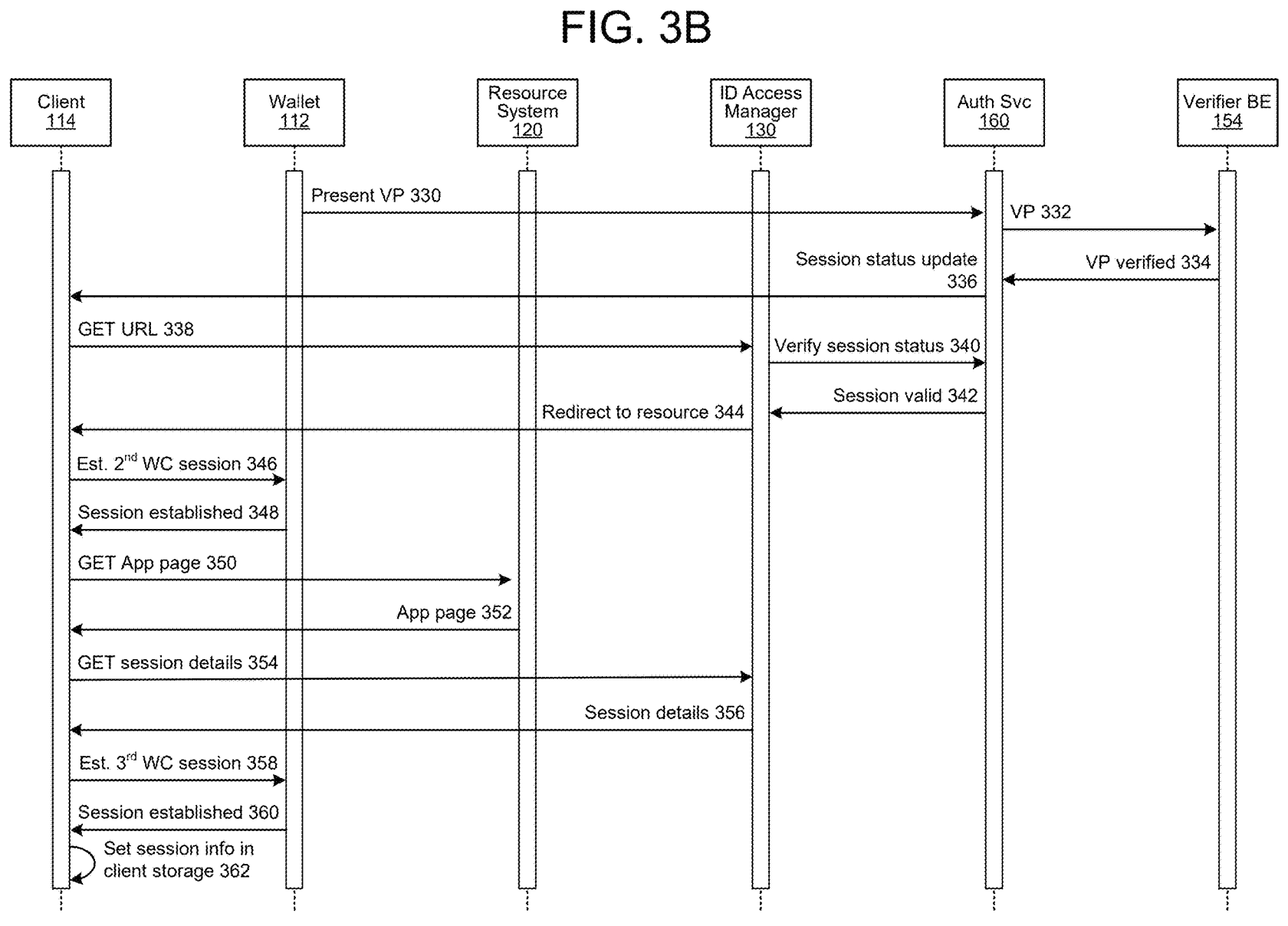

FIGS. 3A and 3B are signal flow diagrams illustrating an example login process, according to embodiments of the present disclosure. It is presumed that the user 5 has obtained the required VC and stored it in their digital wallet 112 (e.g., via a process such as the one illustrated in FIGS. 2A and 2B). The user 5 may then use their user device(s) 110 to gain access to a resource hosted by resource system 120. In some cases, the user's wallet 112 and client 114 may be on the same user device 110. In some cases, the wallet 112 may be on the first user device 110*a* while the client 114 may be on the second user device 110*b*. In either case, the user 5 may use their client 114 to request to access a resource. The resource system 120 hosting the resource may redirect the client 114 to the ID access manager 130 to begin the login process. The ID access manager 130 may present the client 114 with a page that presents a QR code provided by the verifier front end 152. The user 5 can scan a QR code using the wallet 112 to generate a VP and send it to the authentication service 160. If the VP corresponds to a valid session, the authentication service 160 will notify the ID access manager 130, which will provide the client 114 with an authentication token 125 and redirect it to the resource system 120. The client 114 can then establish a communication pipeline with the resource system 120.

In further detail, the login steps may be as follows. At step 302, the user 5 may navigate the client 114 to the resource. If the client 114 is not currently logged in, the resource system 120 hosting the resource may, at step 304, redirect the client 114 to a login page of the ID access manager 130. The redirect may cause the client 114 to, at step 306, send a request to the ID access manager 130 for an email form into which the user 5 may enter their email address. At step 308, the ID access manager 130 may send the email form to the client 114, which may present it to the user 5. The user 5 may enter their email address and, at step 310, the client 114 may send the email address to the ID access manager 130.

At step 312, the ID access manager 130 may request a session identifier (sessionID) from the authentication service 160. The ID access manager 130 may state parameters for how a VP should be verified for the session (e.g., "verficationParameters"). For example, the session parameters may include attributes that the user 5 must establish to login. At step 314, the authentication service 160 may return the requested sessionID (e.g., contained within a session cookie) to the ID access manager 130.

At step 316, the ID access manager 130 may present the client 114 with a QR code page corresponding to the session(ID). At step 318, the client 114 may send the verifier front end 152 the sessionID along with a request to for QR code contents (e.g., to "see" the QR code for the sessionID). At step 320, the verifier front end 152 may return the QR code contents to the client 114. At step 322, the client 114 may display the QR code on the page provided by the ID access manager 130.

During this period, the client 114 may, at step 324, send the authentication service 160 a request to subscribe to a session info callback using the sessionID. This may allow the client 114 to receive a session status update when the verifier 150 verifies the VP generated by the wallet 112. The client 114 may subscribe using a GET command (e.g., "GET /login/session/{sessionID}/status/"). At step 326, the authentication service 160 may send a status of the session corresponding to the sessionID. The step 326 may repeat or loop, with the authentication service 160 periodically sending a session status (e.g., every 1, 2, 5 second, etc.).

At step 328, the user 5 may scan the QR code displayed by the client 114 using the wallet 112. The wallet 112 may use the VC (e.g., previously received from the issuer 140) to generate a VP that demonstrates possession of the VC. At step 330, the wallet 112 may send the VP to the authentication service 160 (e.g., using a POST command: "POST /login/presentation/").

The login process may continue with the steps shown in FIG. 3B. At step 332, the authentication service may send the VP to the verifier back end 154. The verifier back end 154 may verify the VP (e.g., using the public key of the issuer 140) and, if verification is successful, updates the session status for session ID. At step 334, the verifier back end 154 may send the authentication service 160 an indication that the VP has been verified.

At step 336, the authentication service 160 may notify the client 114 that the session has been updated. The authentication service 160 may execute step 336 in response to receiving the indication step 334 and/or as part of the periodic status update the client 114 subscribed to at step 324. Upon receiving the session status update, the login page displayed by the client 114 may request an action URL for the ID access manager 130. At step 338, the client 114 may send the request for the action URL to the ID access manager 130. The request may include the username and a temporary password. At step 340, the ID access manager 130 may verify the session status with the authentication service 160. At step 342, the authentication service 160 may verify the session based on the username and temporary password, and return an indication that the session is valid to the ID access manager 130. In some cases, the authentication service 160 may additionally verify that the attributes in the VC/VP match the expected values stored in the user profile 134, and/or that the DID signature on the VP matches the DID public key extracted from the VC. The authentication service 160 may send the user DID (e.g., extracted from the VC), to the ID access manager 130, which may store the DID in the user profile 134. Upon receiving the indication that the session is valid, the ID access manager 130 may, at step 344, send an authentication token 125 to the client 114 and redirect the client 114 to the requested resource. The redirect may include an HTTP status code 304 indicating that the client 114 does not need to resubmit the request.

Following authentication and redirect, the steps 346 through 362 may be similar to the steps 240 to 256 described previously with reference to FIG. 2B. The operations illustrated in FIGS. 3A and 3B (e.g., establishing the successive wallet connect sessions) do not require multiple authentications by the user 5. The user 5 can simply provide their email address at step 310, scan the QR code at step 328, and approve the presentation of their VC, and the system can securely handle the verifications and exchanges of data used to establish the wallet connect session at step 362/364. With this session established, the resource system 120 may send requests to the wallet 112 (e.g., for identity, credentials, payments, etc.) based on interactions with the client 114. The wallet 112 may prompt the user 5 to confirm a request and, if the user 5 approves, the wallet 112 may provide the resource system 120 with the requested data.

FIG. 4 is a conceptual diagram illustrating an example method 400 of facilitating registration and authentication of a user requesting access to a resource, according to embodiments of the present disclosure. The method 400 may be performed by the ID access manager 130. In some implementations, the ID access manager 130 may operate in conjunction with the authentication service 160 (which may be a component or plugin of the ID access manager 130 or a standalone service). The method 400 may include receiving (405) from the client application 114 executing on a user device 110, a first request to access a first application hosted by a resource system 120. The ID access manager 130 may receive the first request based on a redirect from the resource system 120. The method 400 may include receiving (410) from the wallet 112, a VP corresponding to the first request. For example, the ID access manager 130 may cause the client 114 to present a sign-up page. The user 5 may enter their email address in the sign-up page for the client 114 to forward to the ID access manager 130. The ID access manager 130 may, in response to receiving the first request and/or the email address, cause the client application to present a QR code (e.g., provided by a verifier system 150). The user may scan the QR code using their digital wallet application 112, and confirm presentation of their VC. In some cases, the wallet 112 and the client 114 may correspond to the same user device 110. In some cases, the wallet 112 and the client 114 may correspond to different user devices 110. The wallet 112 may generate and send the VP to an endpoint indicated in the QR code. The method 400 may include verifying (415) that the VP demonstrates possession of a verifiable credential (VC) that corresponds to access to the first application. For example, the VP may be forwarded to the verifier system 150, which may return an indication to the ID access manager 130 that the VP demonstrates possession of the appropriate VC. In response to verifying that the first VP demonstrates possession of the VC, the method 400 may include establishing (420) a first session (e.g., a wallet connect session) corresponding to a domain of the ID access manager 130. In some cases, establishing the first session may be further subject to verifying that the email address received from the client 114 via the sign-up page matches the email address received from the wallet 112 (e.g., in the VP). The method 400 may include sending (425) an authentication token corresponding to the first session to the client 114. The method 400 may include receiving (430), from the client 114, second data representing a second request for session data corresponding to the first session. The method 400 may include sending (435) the session data to the client. The session data may allow the application to establish a second session corresponding to a domain of the resource system 120.

In some cases, the method 400 may including facilitating authentication for a second application. The user 5 need not repeat the registration steps to authenticate for the second application. Rather, the user may send a request for access to the resource system 120 hosting the second resource. The resource system 120, which may be the same or different from the one hosting the first application, may redirect the client 114 to the ID access manager 130. The ID access manager 130 may request a second VP from the user 5 (e.g., by presenting a second QR code). Based on verifying that the second VP demonstrates possession of the appropriate VC (which may be the same as or different from the VC used to authenticate for the first application), the ID access manager 130 may establish a new wallet connect session through which the client 114 may obtain session details for establishing a wallet connect session corresponding to the domain of the second application. In some cases, the first application and the second application may both use Web2-based authentication, both use Web3-based authentication, or one may use Web2-based authentication while the other uses Web3-based authentication.

FIG. 5 is a conceptual diagram illustrating an example method 500 of facilitating authentication of a previously registered user requesting access to a resource, according to embodiments of the present disclosure. The method 500 may be performed by the ID access manager 130. The method 500 may include receiving (505) a first request to access a first application hosted by a resource system 120. The ID access manager 130 may receive the first request from a client application 114 executing on a user device 110. The request may be received based on a redirect from the resource system 120. The method 500 may include causing (510) the client application to present a sign-up page. The method 500 may include receiving (515), from the client application, an email address submitted via the sign-up page. The method 500 may include sending (520) a verification link to the email address. The verification link may correspond to a request for a verified credential (VC) from a trusted issuer 140. For example, the verification link may include a URL to an endpoint hosted by the ID access manager 130. When the user 5 selects the verification link, the client 114 may be directed to the endpoint, which may redirect the client 114 to the issuer 140. The issuer 140 may send the client 114 a page displaying a QR code. The user 5 may scan the QR code with their digital wallet application 112. In some cases, the wallet 112 and the client 114 may correspond to the same user device 110. In some cases, the wallet 112 and the client 114 may correspond to different user devices 110. By scanning the QR code, the wallet 112 may establish a wallet connect session with the issuer 140 through which the wallet may obtain a VC for accessing the first application. The wallet 112 may confirm receipt of the VC (and/or decryption of the VC, if it has been encrypted by the issuer 140). When the issuer 140 receives confirmation of the wallet 112 receiving/decrypting the VC, it may notify the ID access manager 130 that the wallet 112 was successfully registered. Accordingly, the method 500 may include receiving (525), from the issuer 140, first data representing an indication of successful registration of the VC. The indication may include an attribute such as a decentralized identifier (DID) corresponding to a digital wallet application used to obtain the VC. In response to receiving the indication, the method 500 may include establishing (530) a first session (e.g., a wallet connect session) between the client application and the digital wallet application. The first session may correspond to a domain of the ID access manager 130. The method 500 may include sending (535) an authentication token corresponding to the first session to the client 114. The method 500 may include receiving (540), from the client 114, second data representing a second request for session data corresponding to the first session. The method 500 may include sending (545) the session data to the client based on the first session. The session data may allow the application to establish a second session corresponding to a domain of the first application (and/or of the resource system 120 hosting the first application).

In some cases, the method 500 may including facilitating authentication for a second application. The user 5 need not repeat the registration steps to authenticate for the second application if the second application accepts the same VC (or another VC the wallet 112 already has). The user may request access to the second resource, which may redirect the client 114 to the ID access manager 130. The ID access manager 130 may request a second VP from the user 5 (e.g., by presenting a second QR code). Based on verifying that the second VP demonstrates possession of the appropriate VC (which may be the same as or different from the VC used to authenticate for the first application), the ID access manager 130 may establish a new wallet connect session through which the client 114 may obtain session details for establishing a wallet connect session corresponding to the domain of the second application. In some cases, the first application and the second application may both use Web2-based authentication, both use Web3-based authentication, or one may use Web2-based authentication while the other uses Web3-based authentication.

FIG. 6 is a block diagram illustrating an example client device 600 and system component 650 communicating over a computer network 199, according to embodiments of the present disclosure. While the device 600 may operate locally to a user (e.g., within a same environment so the device may receive inputs and playback outputs for the requestor) the system component(s) 650 may be located remotely from the device 600. The system component(s) 650 may be located in an entirely different location from the device 600 (for example, as part of a cloud computing system or the like).

The device 600 may include one or more controllers/processors 604, which may each include a central processing unit (CPU) for processing data and computer-readable instructions, and a memory 606 for storing data and instructions of the respective device. The memories 606 may individually include volatile random-access memory (RAM), non-volatile read only memory (ROM), non-volatile magnetoresistive memory (MRAM), and/or other types of memory. Device 600 may also include a data storage component 608 for storing data and controller/processor-executable instructions. Each data storage component 608 may individually include one or more non-volatile storage types such as magnetic storage, optical storage, solid-state storage, etc. Device 600 may also be connected to removable or external non-volatile memory and/or storage (such as a removable memory card, memory key drive, networked storage, etc.) through respective input/output device interfaces 602.

Computer instructions for operating device 600 and its various components may be executed by the respective device's controller(s)/processor(s) 604, using the memory 606 as temporary "working" storage at runtime. A device's computer instructions may be stored in a non-transitory manner in non-volatile memory 606, data storage component 608, or an external device(s). Alternatively, some or all of the executable instructions may be embedded in hardware or firmware on the respective device in addition to or instead of software.

Device 600 includes input/output device interfaces 602. A variety of components may be connected through the input/output device interfaces 602, as will be discussed further below. Additionally, device 600 may include an address/data bus 610 for conveying data among components of the respective device. Each component within a device 600 may also be directly connected to other components in addition to (or instead of) being connected to other components across the bus 610.

The device 600 may include input/output device interfaces 602 that connect to a variety of components such as an audio output component such as a speaker 612, a wired headset or a wireless headset (not illustrated), or other component capable of outputting audio. The device 600 may also include an audio capture component. The audio capture component may be, for example, a microphone 620 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 600 may additionally include a display 616 for displaying content. The device 600 may further include a camera 618.

Via antenna(s) 622, the input/output device interfaces 602 may connect to one or more computer networks 199 via a wireless local area network (WLAN) (such as Wi-Fi) radio, Bluetooth, and/or wireless network radio, such as a radio capable of communication with a wireless communication network such as a Long-Term Evolution (LTE) network, WiMAX network, 3G network, 4G network, 5G network, etc. A wired connection such as Ethernet may also be supported. Through the network(s) 199, the system may be distributed across a networked environment. The I/O device interface 602 may also include communication components that allow data to be exchanged between devices such as different physical servers in a collection of servers or other components.

The system component 650 may include one or more physical devices and/or one or more virtual devices, such as virtual systems that run in a cloud server or similar environment. The system component 650 may include one or more input/output device interfaces 652 and controllers/processors 654. The system component 650 may further include a memory 656 and storage 658. A bus 660 may allow the input/output device interfaces 652, controllers/processors 654, memory 656, and storage 658 to communicate with each other; the components may instead or in addition be directly connected to each other or be connected via a different bus.

A variety of components may be connected through the input/output device interfaces 652. For example, the input/output device interfaces 652 may be used to connect to the computer network 199. Further components include keyboards, mice, displays, touchscreens, microphones, speakers, and any other type of user input/output device. The components may further include USB drives, removable hard drives, or any other type of removable storage.

The controllers/processors 654 may process data and computer-readable instructions and may include a general-purpose central-processing unit, a specific-purpose processor such as a graphics processor, a digital-signal processor, an application-specific integrated circuit, a microcontroller, or any other type of controller or processor. The memory 656 may include volatile random-access memory (RAM), non-volatile read only memory (ROM), non-volatile magnetoresistive (MRAM), and/or other types of memory. The memory 656 may be used for storing data and controller/processor-executable instructions on one or more non-volatile storage types, such as magnetic storage, optical storage, solid-state storage, etc.

Computer instructions for operating the system component 650 and its various components may be executed by the controller(s)/processor(s) 654 using the memory 656 as temporary "working" storage at runtime. The computer instructions may be stored in a non-transitory manner in the memory 656, storage 658, and/or an external device(s). Alternatively, some or all of the executable instructions may be embedded in hardware or firmware on the respective device in addition to or instead of software.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and data processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving, by an identity access manager system from a client application executing on a user device based on a redirect from a first resource system, a first request to access a first application hosted by the first resource system;
receiving, from a digital wallet application, a first verifiable presentation (VP) corresponding to the first request;
verifying that the first VP demonstrates possession of a verifiable credential (VC) that corresponds to access to the first application;

in response to verifying that the first VP demonstrates possession of the VC, establishing a first session between the client application and the digital wallet application, the first session corresponding to a domain of the identity access manager system;
sending a first authentication token corresponding to the first session to the client application;
receiving, from the client application, the first authentication token and second data representing a second request for first session data corresponding to the first session; and
sending the first session data to the client application based on the first session, the first session data allowing the first application to establish a second session between the client application and the digital wallet application, the second session corresponding to a domain of the first resource system.

2. The computer-implemented method of claim 1, further comprising:
in response to receiving the first request, causing the client application to display a quick-response (QR) code representing a destination for the first VP, the digital wallet application generating the VP in response to scanning the QR code displayed by the client application.

3. The computer-implemented method of claim 1, further comprising:
after receiving the first VP, sending the VP to a verifier system for verification; and
receiving, from the verifier system, an indication that the VP demonstrates possession of the VC.

4. The computer-implemented method of claim 1, further comprising:
in response to the first request, causing the client application to present a sign-up page;
receiving, from the client application based on presentation of the sign-up page, an email address; and
determining that the first VP received from the digital wallet application includes a representation of the email address, wherein establishing the first session is additionally based on determining that the first VP includes a representation of the email address.

5. The computer-implemented method of claim 1, further comprising:
receiving, from the user device based on a redirect from a second resource system, third data representing a third request to access a second application;
receiving, from the digital wallet application, a second VP corresponding to the third request;
verifying that the second VP demonstrates possession of the VC;
in response to verifying that the second VP demonstrates possession of the VC, establishing a third session between the client application and the digital wallet application; and
sending, to the client application based on the third session, second session data allowing the second application to establish a fourth session corresponding to a domain of the second resource system.

6. The computer-implemented method of claim 5, wherein the first application corresponds to Web3-based authentication, and the second application corresponds to Web2-based authentication.

7. The computer-implemented method of claim 1, further comprising:

prior to receiving the first request, receiving, from the user device, third data representing a third request to access a second application;

causing the user device to present a sign-up page;

receiving an email address from the user device;

sending a verification link to the email address, the verification link corresponding to a request for the VC from a trusted issuer;

receiving, from the trusted issuer, an indication of successful registration of the VC;

in response to receiving the indication, establishing a third session between the client application and the digital wallet application; and sending, to the client application based on the third session, second session data allowing the second application to establish a fourth session corresponding to a domain of the second application.

8. A system, comprising:

one or more processors; and at least one memory comprising instructions that, when executed by the one or more processors, cause the system to:

receive, by an identity access manager system from a client application executing on a user device based on a redirect from a first resource system, a first request to access a first application hosted by the first resource system;

receive, from a digital wallet application, a first verifiable presentation (VP) corresponding to the first request;

verify that the first VP demonstrates possession of a verifiable credential (VC) that corresponds to access to the first application;

in response to verifying that the first VP demonstrates possession of the VC, establish a first session between the client application and the digital wallet application, the first session corresponding to a domain of the identity access manager system;

send a first authentication token corresponding to the first session to the client application;

receive, from the client application, the first authentication token and second data representing a second request for first session data corresponding to the first session; and send the first session data to the client application based on the first session, the first session data allowing the first application to establish a second session between the client application and the digital wallet application, the second session corresponding to a domain of the first resource system.

9. The system of claim 8, wherein the at least one memory further comprises instructions that, when executed by the one or more processors, further cause the system to:

in response to receiving the first request, cause the client application to display a quick-response (QR) code representing a destination for the first VP, the digital wallet application generating the VP in response to scanning the QR code displayed by the client application.

10. The system of claim 8, wherein the at least one memory further comprises instructions that, when executed by the one or more processors, further cause the system to:

after receiving the first VP, send the VP to the verifier system for verification; and receive, from the verifier system, an indication that the VP demonstrates possession of the VC.

11. The system of claim 8, wherein the at least one memory further comprises instructions that, when executed by the one or more processors, further cause the system to:

in response to the first request, causing the client application to present a sign-up page;

receiving, from the client application based on presentation of the sign-up page, an email address; and determine that the first VP received from the digital wallet application includes a representation of the email address, wherein establishing the first session is additionally based on determining that the first VP includes a representation of the email address.

12. The system of claim 8, wherein the at least one memory further comprises instructions that, when executed by the one or more processors, further cause the system to:

receive, from the user device based on a redirect from a second resource system, third data representing a third request to access a second application;

receive, from the digital wallet application, a second VP corresponding to the third request;

verify that the second VP demonstrates possession of the VC;

in response to verifying that the second VP demonstrates possession of the VC, establish a third session between the client application and the digital wallet application; and sending, to the client application based on the third session, second session data allowing the second application to establish a fourth session corresponding to a domain of the second resource system.

13. The system of claim 12, wherein the first application corresponds to Web3-based authentication, and the second application corresponds to Web2-based authentication.

14. The system of claim 8, wherein the at least one memory further comprises instructions that, when executed by the one or more processors, further cause the system to:

prior to receiving the first request, receive, from the user device, third data representing a third request to access a second application;

cause the user device to present a sign-up page;

receive an email address from the user device;

send a verification link to the email address, the verification link corresponding to a request for the VC from a trusted issuer;

receive, from the trusted issuer, an indication of successful registration of the VC;

in response to receiving the indication, establishing a third session between the client application and the digital wallet application; and send, to the client application based on the third session, second session data allowing the second application to establish a fourth session corresponding to a domain of the second application.

15. A computer-implemented method comprising:

receiving, by an identity access manager system from a client application executing on a user device based on a redirect from a first resource system, a first request to access a first application hosted by the first resource system;

causing the client application to present a sign-up page;

receiving a first email address from the client application;

sending a verification link to the first email address, the verification link corresponding to a request for a verified credential (VC) from a trusted issuer;

receiving, from the trusted issuer, first data representing an indication of successful registration of the VC and a decentralized identifier (DID) corresponding to a digital wallet application used to obtain the VC;

in response to receiving the indication, establishing a first session between the client application and the digital wallet application, the first session corresponding to a domain of the identity access manager system;

sending a first authentication token corresponding to the first session to the client application;

receiving, from the client application, the first authentication token and second data representing a second request for first session data corresponding to the first session; and sending the first session data to the client application based on the first session, the first session data allowing the first application to establish a second session between the client application and the digital wallet application, the second session corresponding to a domain of the first resource system.

16. The computer-implemented method of claim 15, wherein selecting the verification link causes the client application to display a quick-response (QR) code, the digital wallet application scanning the QR code to obtain the VC.

17. The computer-implemented method of claim 15, further comprising:

receiving, from the client application based on a redirect from a second resource system, third data representing a third request to access a second application;

receiving, from the digital wallet application, a verifiable presentation (VP) corresponding to the third request;

verifying that the VP demonstrates possession of the VC;

in response to verifying that the VP demonstrates possession of the VC, establishing a third session between the client application and the digital wallet application; and sending, to the client application based on the third session, second session data allowing the second application to establish a fourth session corresponding to a domain of the second application.

18. The computer-implemented method of claim 17, further comprising:

in response to receiving the third request, causing the client application to display a quick-response (QR) code representing a destination for the VP, the digital wallet application generating the VP in response to scanning the QR code displayed by the client application.

19. The computer-implemented method of claim 17, further comprising:

in response to the second request, causing the client application to present a sign-up page;

receiving, from the client application based on presentation of the sign-up page, the email address; and determining that the VP received from the digital wallet application includes a representation of the email address, wherein establishing the second session is additionally based on determining that the VP includes the email address.

20. The computer-implemented method of claim 17, wherein the first application corresponds to Web3-based authentication, and the second application corresponds to Web2-based authentication.

* * * * *